United States Patent [19]

Ishibashi et al.

[11] Patent Number: 5,008,669
[45] Date of Patent: Apr. 16, 1991

[54] ENCODING/DECODING SYSTEM FOR OPTICAL RECORDING/READING

[75] Inventors: Hiromichi Ishibashi, Toyonaka; Shinichi Tanaka, Kyoto, both of Japan

[73] Assignee: Matsushita Electric Industrial Co., Ltd., Osaka, Japan

[21] Appl. No.: 383,153

[22] Filed: Jul. 19, 1989

[30] Foreign Application Priority Data

Jul. 22, 1988 [JP] Japan ................. 63-184308

[51] Int. Cl.[5] ............................................. H03M 7/20
[52] U.S. Cl. ................................... 341/102; 369/124; 341/95
[58] Field of Search ................. 369/59, 124; 360/32; 341/59, 95, 106, 55, 102, 103

[56] References Cited

U.S. PATENT DOCUMENTS

| | | | |
|---|---|---|---|
| 3,599,205 | 8/1971 | Wassenaar et al. | 341/102 |
| 3,883,857 | 5/1975 | Magnusson | 341/102 |
| 4,176,287 | 11/1979 | Ramedi | 341/102 |
| 4,177,455 | 12/1979 | Armstrong et al. | 341/103 |
| 4,358,852 | 11/1982 | Ichikawa et al. | 341/95 |
| 4,494,151 | 1/1985 | Liao | 341/106 |
| 4,496,934 | 1/1985 | Furukawa | 341/106 |
| 4,591,829 | 5/1986 | Takeda | 341/106 |
| 4,597,057 | 6/1986 | Snow | 341/106 |
| 4,598,267 | 7/1986 | Fukuda | 341/106 |
| 4,598,326 | 7/1986 | Leiner | 341/95 |
| 4,628,297 | 12/1986 | Mita et al. | 341/106 |
| 4,646,281 | 2/1987 | Verboom | |
| 4,802,154 | 1/1989 | Verboom et al. | 369/124 |
| 4,819,222 | 4/1989 | Kimura | 369/124 |

Primary Examiner—William M. Shoop, Jr.
Assistant Examiner—Marc S. Hoff
Attorney, Agent, or Firm—Wenderoth, Lind & Ponack

[57] ABSTRACT

A system for encoding/decoding an 8-bit binary code into/from a 4/11 channel code is disposed such that an 8-bit binary code is encoded into a 11-bit channel code by adding a 3-bit extension code as a parity code which keeps the number of "1"s in the channel code at four. When the 8-bit binary code cannot be encoded by this rule, it is converted to a temporary 8-bit code by a table encoder and then a 3-bit extension code is added. The 4/11 channel code is decoded referring to the 3-bit extension code, which indicates the encoding rule by which the 4/11 channel code has been generated. When the 4/11 channel code is detected to have been encoded by the bits-adding rule, an original 8-bit binary code is derived from the 4/11 code by removing the 3-bit extension code. When the 4/11 channel code has been encoded by the table-encoding rule, it is decoded by a table decoder.

8 Claims, 7 Drawing Sheets

ENCODING/DECODING SYSTEM FOR OPTICAL RECORDING/READING

BACKGROUND OF THE INVENTION

1. Field of the Invention

This invention relates to an apparatus for encoding a binary code into channel code containing a fixed number of "1"s or "0"s for optical recording and an apparatus for decoding a reproduced channel code into its original binary code.

2. Description of the Prior Art

Optical recording/reading technology has long been studied. Recently, discussions on encoding/decoding (ENCDEC) technology especially suitable to optical record carriers are often reported. "Encoding" means a procedure to convert a binary code (generally composed of eight bits of data) into a channel code which will be recorded on a record carrier. "Decoding" means the reverse procedure of "encoding", i.e. to convert the channel code into the original binary code. The ENCDEC technology has been evolved for more than twenty years in the field of magnetic recording/reproducing technology. Most of all, the (2,7) ENCDEC scheme is well known to offer distinguished recording efficiency —high density and low error rate. In early stages of the development of optical recording/reading, the (2,7) ENCDEC scheme was considered the most suitable scheme.

But a recent study shows that there exist other ENCDEC schemes which will provide a greater record density and lower error rate than the (2,7) scheme, especially for the optical recording/reading in noisy conditions. One of them is well known as an i/N (i out of N) ENCDEC scheme. The "N" represents the word length of one channel code and the "i" the number of "1"s in the channel code. Every N-bit code produced by this scheme has the exact number, i, of "1"s and N-i "0"s. The i/N codes — codes produced by the scheme — are suitable for optical recording/reading especially in noisy conditions since bit-errors can be detected very easily. When an N-bit channel code read from an optical record carrier does not have exact by "1"s, the channel code is regarded as having bit-errors.

A typical encoding/decoding system for the i/N ENCDEC scheme is disclosed in U.S. Pat. No. 4,646,281, issued on Feb 24, 1987. This system aims at encoding an 8-bit binary code into a 14-bit channel code having exact by four "1"s in it and decoding the 14-bit channel code into the original 8-bit binary code. The encoding system comprises a first table encoder for converting the upper 4 bits of the 8-bit binary code into 7 bits of the 14-bit channel code and a second table encoder for converting the lower 4 bits of the 8-bit binary code into the 7 bits of the 14-bit channel code. The former 7 bits form the even bits form and the latter 7 bits the odd bits of the 14-bit channel code. Each of the first and second table encoders is designed to produce 16 patterns of 7-bit codes having exact by two "1"s in accordance with the 4-bit codes varying from 0000 to 1111 (from 0 to 15 in decimal). Therefore, $256 (=6\times16)$ patterns of the 14-bit channel codes containing four "1"s are obtained.

Similarly, the decoding system comprises a first table decoder for converting the even-numbered 7 bits of the 14-bit channel code to the upper 4 bits of the 8-bit binary code and a second table decoder for converting the odd-numbered 7 bits of the 14-bit channel code into the lower 4 bit of the 8-bit binary code.

U.S. Pat. No. 4,646,281 discloses a technique to produce the 4/14 codes efficiently, i.e. with a small electrical circuit. As is well known, there exist 256 patterns in the set consisting of all of the 256 8-bit binary codes (from 00000000 to 11111111). Therefore, 256 independent 256 channel codes are necessary for all of the 8-bit binary codes. If the conversion from 8-bit codes to 4/14 codes were expressed by a simple logic equation, the ENCDEC circuit could be small. But there have not been found proper logic equations which can convert all of 8-bit codes to practical i/N codes (when N is large enough, it may be possible). Therefore, a 256 encoder circuits is imperative for converting 256 8-bit codes to appropriate 256 4/14 codes. A set of those circuits is known as a "table encoder". On the assumption that a circuit for converting an 8-bit binary code to a corresponding 4/14 channel code needs ten logic gates in are needed on the average, e.g. NAND or NOR gates, approximately 2500 for such a table encoder in the absence of the technology disclosed in U.S. Pat. No. 4,646,281. But according to U.S. Pat. No. 4,646,281, no more than 32 encoder circuits convert all of the 8-bit codes into corresponding 4/14 codes. As described before, each 8-bit binary code is split into upper and lower 4-bit codes. Then, these 4-bit codes are encoded into 2/7 (2 out of 7) codes located at even- and odd-bit positions of the 4/14 channel code. Therein, sixteen conversion circuits can form the table encoder for each of the upper and the lower 4 bits of the 8-bit binary codes. In total, thirty-two conversion circuits can produce 4/14 codes from 8-bit binary codes.

The 4/14 channel code can be decoded into the original 8-bit binary code in the same manner as described above. Also in this case, a table decoder comprising 32 decoder circuits can decode all of the 4/14 channel codes.

For more practical application, U.S. Pat. No. 4,646,281 shows a 4/15 codes set as an embodiment. Fourteen of the fifteen bits are produced by the dual-table encoders as explained before. Thereafter, a "0" as the fifteenth bit is added to the 4/14 codes in order to separate a current channel code from adjacent channel codes recorded before and after the current channel code .

In the above-described system, however, the word length N should be 14 or more. As described before, the i/N codes, being resistant to noise, need extra word length by N-8 (N>8) in comparison with the original 8-bit binary code due to the redundancy of the i/N codes; i.e. in the case of 4/14 codes, 14 bits are necessary to express 8-bit information. Generally, the smaller the word length N is, the more recording density will be achieved. The total number of members expressed by 4/N codes is calculated at: N=10,11,12,13 and 14 as follows:

| | |
|---|---|
| N = 10 | 4C10 = 210 |
| N = 11 | 4C11 = 330 |
| N = 12 | 4C12 = 495 |
| N = 13 | 4C13 = 715 |
| N = 14 | 4C14 = 1001 |

These results show that only 4/N:N≧11 codes can be employed as the channel codes for expressing 256 of 8-bit binary codes. When 4/11 codes are employed instead of the 4/14 codes, the recording density will increase by 27%.

But high density i/N codes like 4/11 codes cannot be produced using the technique disclosed in U.S. Pat. No. 4,646,281. In that patent, not only must the total number of the i/N codes (iCN) be 256 or more but also the total number of "half" channel codes (i/2CN/2) must be 16 or more (16: total number of 4-bit codes). As examples, in the case of 4/12 and 4/14 codes:

| N = 12 | 2C6 = 15 (the number of 2/6 codes) |
|---|---|
| N = 14 | 2C7 = 21 (the number of 2/7 codes) |

Clearly, the ENCDEC system in U.S. Pat. No. 4,646,281 cannot be applied for the i/N codes in which the word length N is less than 14.

SUMMARY OF THE INVENTION

Accordingly it is an object of this invention to provide an encoder/decoder system for 4/11 codes using a small circuit.

According to the present invention, to achieve the above object, a part of of 8-bit binary codes are encoded/decoded by means of table encoder/decoder and the other part of the 8-bit binary codes are encoded/decoded by adding/removing 3-bit extension codes which work as parity codes for keeping the number of "1"s in the channel code at 4.

In one aspect of the present invention, 8-bit binary codes having 2,3 or 4 "1"s in each are encoded into 4/11 channel codes by adding an extension code "110", "100" or "000" (having 2,1 or 0 "1"s) respectively, 8-bit binary codes having 5 or 6 "1"s are encoded by inverting the logic and then adding an extension code "001" or "101" (having 1 or 2 "1"s) respectively, and the other 8-bit binary codes are encoded into 4/11 codes having "010" at the positions of the extension code by means of a table encoder.

In another aspect of the present invention, 8-bit binary codes having four successive "1"s are encoded by a table encoder into 4/11 channel codes in which four "1" are not positioned in succession in order to make run length shorter.

In still another aspect of the present invention, the 4/11 channel codes having the extension code "110", "100" or "000" are decoded into 8-bit binary codes simply by picking up the upper 8 bits from the 11-bit channel code, 4/11 channel codes having the extension code "001" or "101" are decoded to into the 8-bit binary codes by picking up the upper 8 bits from the 11-bit channel code and by then inverting the logic, and the 4/11 channel codes having the extension code "010" are decoded by a table decoder.

In still another aspect of the present invention, the table encoder is replaced by an encoding circuit implemented by a wired-OR gate and additional logic circuits.

These and other objects, features and advantages of the present invention will be apparent from the following description taken in connection with the accompanying drawings in which:

DESCRIPTION OF THE PREFERRED EMBODIMENTS

Figure 1:
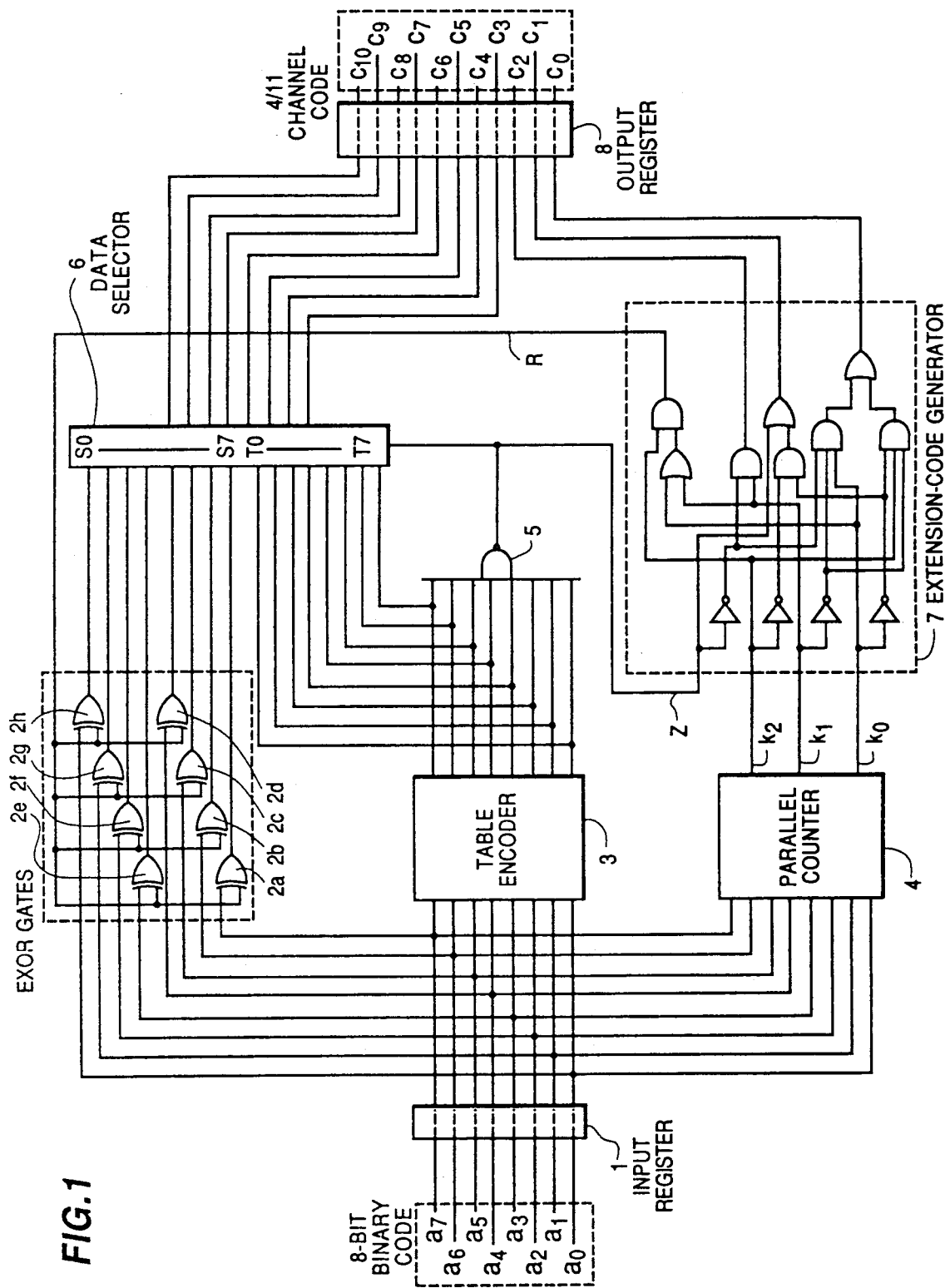
FIG. 1 is a circuit diagram showing a first embodiment of the present invention.

Referring first to FIG. 1, there is illustrated an encoding system as an embodiment of the present invention. An 8-bit binary code (a7a6a5a4a3a2a1a0) loaded into an input register 1 is fed to exclusive-OR(EXOR) gates 2a–2h, a table encoder 3 and a parallel counter 4. The parallel counter 4 counts "1"s in the 8-bit binary code and outputs the sum as a 3-bit code k2k1k0. An extension-code generator 7 generates the lower 3 bits (c2c1c0) of the 11-bit channel code from the 3-bit code k2k1k0 and a flag "Z" (explained later). Furthermore, the extension-code generator 7 outputs a flag "R" which becomes "1" when the output of the parallel counter 4 exceeds four; k2k1k0>100 in binary. The table encoder 3 outputs an 8-bit temporary code (t7t6t5t4t3t2t1t0) when the loaded 8-bit code (a7a6a5a4a3a2a1a0) coincides with one of codes listed in an encoding table provided therein. Otherwise, the table encoder 3 outputs "11111111". An NAND gate 5 outputs "0" as the flag "Z" when it receives "11111111" from the table encoder 3. The EXOR gates 2a–2h invert the logic of the 8-bit code in order to get a7a6a5a4a3a2a1a0 when the flag "R" is "1" and their outputs are fed to a data selector 6 as another 8-bit temporary code (s7s6s5s4s3s2s1s0). The data selector 6 transmits the 8-bit temporary code t7-t0 or the 8-bit temporary code s7-s0 as the upper 8 bits (c10c9c8c7c6c5c4c3) of the 11-bit channel code in accordance with the flag "Z". An output register 8 latches the whole 11-bit channel code c10c9c8c7c6c5c4c3c2c1c0 for outputting to a known recording circuit (not shown in this embodiment).

In order to better understand the invention, a principle of the invention will be explained. The lower 3 bits c2c1c0 in most of the channel codes work as parity codes for keeping the number of "1"s at four. For example, the 8-bit binary code "00011000" and the parity 3-bit code "110" make a 4/11 code "00011000110". The 8-bit binary codes having two, three or four "1"s can be encoded in this manner by adding the 3-bit extension codes shown as follows:

|  | c10 | c9 | c8 | c7 | c6 | c5 | c4 | c3 | c2 | c1 | c0 |
|---|---|---|---|---|---|---|---|---|---|---|---|
| K = 2 | a7 | a6 | a5 | a4 | a3 | a2 | a1 | a0 | 1 | 1 | 0 |
| K = 3 | a7 | a6 | a5 | a4 | a3 | a2 | a1 | a0 | 1 | 0 | 0 |
| K = 4 | a7 | a6 | a5 | a4 | a3 | a2 | a1 | a0 | 0 | 0 | 0 |

Where "K" is a number of "1"s in the current 8-bit binary code A. Therefore, as many as 154 (=2C 8+3C8+4C8) 8-bit binary codes can be encoded to corresponding 4/11 codes.

In the case that more than four "1"s exist in the 8-bit binary code (k2k1k0>100:binary), all the bits of the 8-bit binary code a7a6a5a4a3a2a1a0 are inverted in logic to a/a6a5a4a3a2a1a0 and then another 3-bit extension code is added. For example, the 8-bit binary code "01110111" having six "1"s is inverted to "10001000", and then by adding the extension code "101", the 4/11 channel code "10001000101" is obtained. From now, the 8-bit binary codes having five or six "1"s will be called "negative codes" because they need to be inverted. The 8-bit binary codes having two, three or four "1"s, then, will be called "positive codes". The encoding rule for the negative codes is shown as follows:

|  | c10 | c9 | c8 | c7 | c6 | c5 | c4 | c3 | c2 | c1 | c0 |
|---|---|---|---|---|---|---|---|---|---|---|---|
| K = 5(3) | $\overline{a7}$ | $\overline{a6}$ | $\overline{a5}$ | $\overline{a4}$ | $\overline{a3}$ | $\overline{a2}$ | $\overline{a1}$ | $\overline{a0}$ | 0 | 0 | 1 |
| K = 6(2) | $\overline{a7}$ | $\overline{a6}$ | $\overline{a5}$ | $\overline{a4}$ | $\overline{a3}$ | $\overline{a2}$ | $\overline{a1}$ | $\overline{a0}$ | 1 | 0 | 1 |

Figures in parentheses show the numbers of "1"s in the inverted 8-bit binary codes a7a6a5a4a3a2a1a0. In the rule, as many as 84 (=5C8+6C8) negative 8-bit binary codes are encoded into 4/11 codes. Summarizing both positive and negative codes, 238 of 256 8-bit binary codes are encoded into independent 4/11 codes by adding proper 3-bit extension codes.

The rest of the 8-bit binary codes (there are still 18 codes remaining) are encoded by the table encoder. Examples of table-encoded codes are shown in Table 1. The upper 8 bits of the 4/11 channel codes in the table can be designed freely. The lower 3 bits are defined as "101" so as to distinguish the table-encoded channel codes from the positive and the negative codes in the former examples.

TABLE 1

| a7 | a6 | a5 | a4 | a3 | a2 | a1 | a0 | c10 | c9 | c8 | c7 | c6 | c5 | c4 | c3 | c2 | c1 | c0 |
|---|---|---|---|---|---|---|---|---|---|---|---|---|---|---|---|---|---|---|
| 0 | 0 | 0 | 0 | 0 | 0 | 0 | 0 | 1 | 0 | 0 | 1 | 0 | 0 | 1 | 0 | 0 | 1 | 0 |
| 1 | 0 | 0 | 0 | 0 | 0 | 0 | 0 | 1 | 1 | 0 | 1 | 0 | 0 | 0 | 0 | 0 | 1 | 0 |
| 0 | 1 | 0 | 0 | 0 | 0 | 0 | 0 | 0 | 1 | 1 | 0 | 1 | 0 | 0 | 0 | 0 | 1 | 0 |
| 0 | 0 | 1 | 0 | 0 | 0 | 0 | 0 | 0 | 0 | 1 | 1 | 0 | 1 | 0 | 0 | 0 | 1 | 0 |
| 0 | 0 | 0 | 1 | 0 | 0 | 0 | 0 | 0 | 0 | 0 | 1 | 1 | 0 | 1 | 0 | 0 | 1 | 0 |
| 0 | 0 | 0 | 0 | 1 | 0 | 0 | 0 | 0 | 0 | 0 | 0 | 1 | 1 | 0 | 1 | 0 | 1 | 0 |
| 0 | 0 | 0 | 0 | 0 | 1 | 0 | 0 | 1 | 0 | 0 | 0 | 0 | 1 | 1 | 0 | 0 | 1 | 0 |
| 0 | 0 | 0 | 0 | 0 | 0 | 1 | 0 | 0 | 1 | 0 | 0 | 0 | 0 | 1 | 1 | 0 | 1 | 0 |
| 0 | 0 | 0 | 0 | 0 | 0 | 0 | 1 | 1 | 0 | 1 | 0 | 0 | 0 | 1 | 0 | 0 | 1 | 0 |
| 1 | 1 | 1 | 1 | 1 | 1 | 1 | 0 | 0 | 1 | 0 | 1 | 0 | 0 | 0 | 1 | 0 | 1 | 0 |
| 0 | 1 | 1 | 1 | 1 | 1 | 1 | 1 | 0 | 1 | 0 | 1 | 1 | 0 | 0 | 0 | 0 | 1 | 0 |
| 1 | 0 | 1 | 1 | 1 | 1 | 1 | 1 | 0 | 1 | 0 | 1 | 1 | 0 | 0 | 0 | 0 | 1 | 0 |
| 1 | 1 | 0 | 1 | 1 | 1 | 1 | 1 | 0 | 0 | 1 | 0 | 1 | 1 | 0 | 0 | 0 | 1 | 0 |
| 1 | 1 | 1 | 0 | 1 | 1 | 1 | 1 | 0 | 0 | 0 | 1 | 0 | 1 | 1 | 0 | 0 | 1 | 0 |
| 1 | 1 | 1 | 1 | 0 | 1 | 1 | 1 | 0 | 0 | 0 | 0 | 1 | 0 | 1 | 1 | 0 | 1 | 0 |
| 1 | 1 | 1 | 1 | 1 | 0 | 1 | 1 | 1 | 0 | 0 | 0 | 0 | 1 | 0 | 1 | 0 | 1 | 0 |
| 1 | 1 | 1 | 1 | 1 | 1 | 0 | 1 | 1 | 1 | 0 | 0 | 0 | 0 | 1 | 0 | 0 | 1 | 0 |
| 1 | 1 | 1 | 1 | 1 | 1 | 1 | 0 | 0 | 1 | 1 | 0 | 0 | 0 | 0 | 1 | 0 | 1 | 0 |
| others | | | | | | | | 1 | 1 | 1 | 1 | 1 | 1 | 1 | 1 | * | * | * |

The circuits shown in FIG. 1 encode 8-bit binary codes to 4/11 channel codes according to the rules as described above. In order to complete the encoding operation quickly, both circuits for the positive/negative codes and the table-encoded codes work in parallel. In this embodiment, an 8-bit binary code once loaded to the input register 1 is fed both to the table encoder 3 and to the parallel counter 4.

Figure 2:
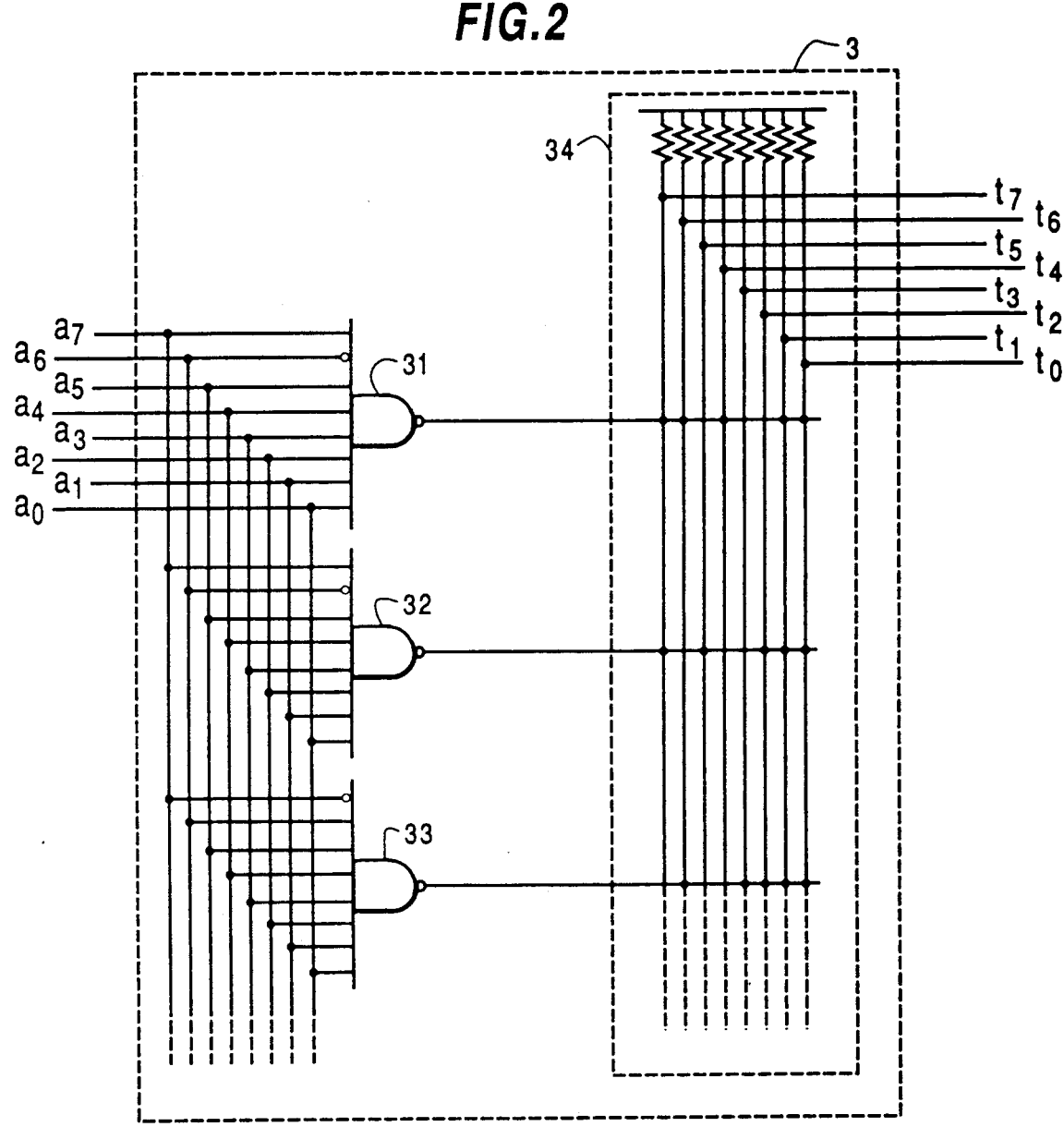
FIG. 2 is a circuit diagram showing a part of a table encoder explained in the first embodiment.

The table encoder 3 comprises eighteen encoder elements combined with a wired-OR matrix. FIG. 2 shows a part of the table encoder 3. Three of eighteen encoder elements 31, 32, 33 and a wired-OR matrix 34 are shown in FIG. 2. Each of the encoder elements 31, 32 and 33 is basically constituted by an 8-bit NAND gate having positive and negative (non-inverting and inverting) inputs and an open-collector output. The wired-OR matrix 34 comprises eight lines corresponding to the temporary 8-bit code t7t6t5t4t3t2t1t0 which are terminated independently by resistors. The encoder element 31 is designed to output "0" when it accepts the 8-bit channel code "11011111". An output (horizontal) line of the encoder element 31 is connected to five of the eight (vertical) lines corresponding to t7, t6, t4, t1 and t0 as dotted in FIG. 2. When the horizontal line becoming "0", the output "00101100" appear on the eight vertical lines. On the other hand, when the 8-bit binary code a7a6a5a4a3a2a1a0 is different from "11011111", the encoder element 31 outputs "1" (open). In this case, the temporary code t7t6t5t4t3t2t1t0 is "11111111".

The encoder element 32 outputs "01011000" as the temporary code t7t6t5t4t3t2t1t0 when the 8-bit binary code is "10111111" and the encoder element 33 outputs "10110000" when the 8-bit binary code is "01111111". In the same manner, every 8-bit binary code listed in Table 1 is encoded into the corresponding temporary code.

The 8-bit NAND gate 5 outputs "0" when the output t7t6t5t4t3t2t1t0 of the table encoder 3 is "11111111", which means that the current 8-bit binary code loaded on the input register 1 does not coincide with any of the binary codes encodable by the table encoder. The output of the 8-bit NAND gate, "Z", is therefore a flag indicating whether or not the current 8-bit binary code is a member of the eighteen codes in the table. When the flag "Z" is "1", the encoding table 3 outputs the correct 8-bit temporary codes corresponding to the 8-bit binary code.

Figure 3:
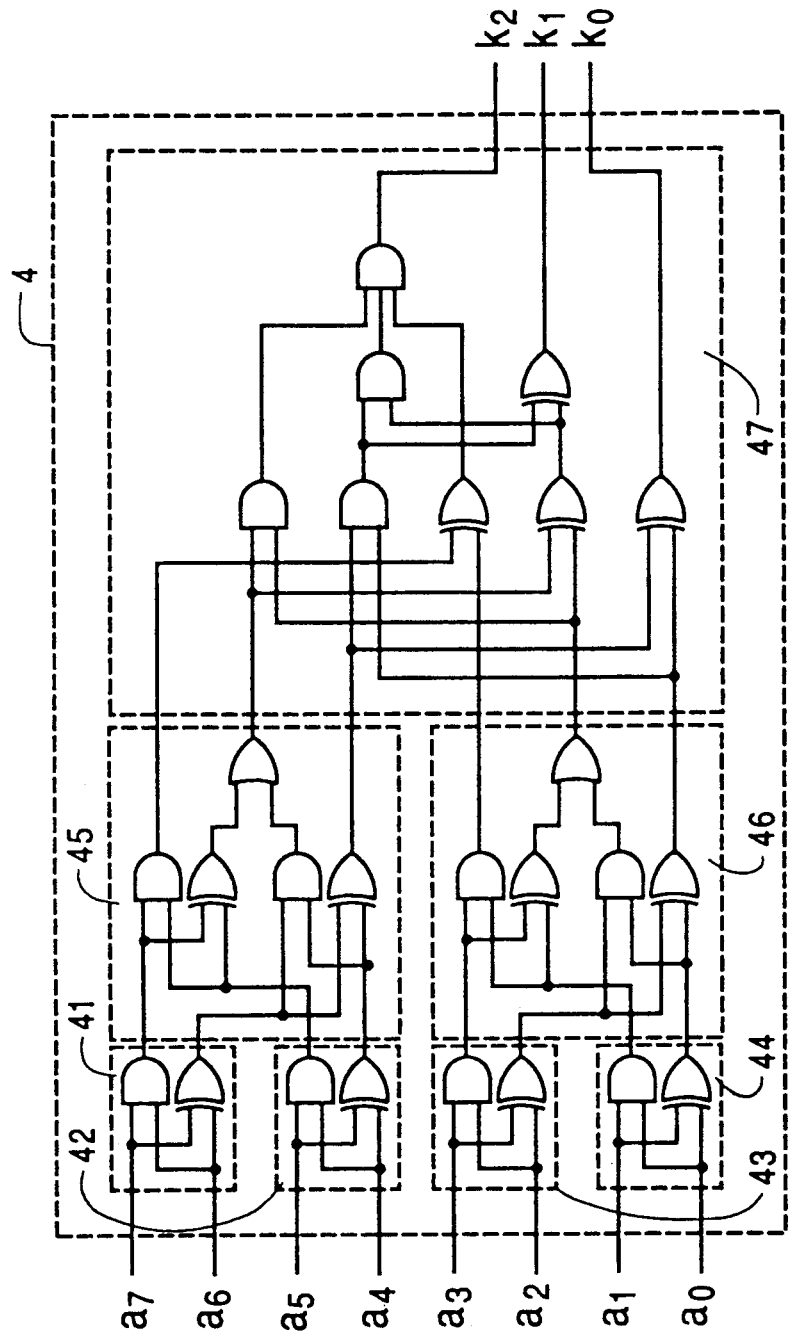
FIG. 3 is a circuit diagram showing a parallel counter explained in the first embodiment.

The parallel counter 4 counts "1"s in the 8-bit binary code and outputs a 3-bit binary code "K (=k2k1k0)" expressing the number of "1"s in the 8-bit binary code. FIG. 3 shows an example of the parallel counter 4. The parallel counter basically comprises adders 41–47. Adders 41,42,43 and 44 are half-adders operating a7+a6, a5+a4, a3+a2 and a1+a0, respectively. Adders 45 and 46, thereafter, operate a7+a6+a5+a4 and a3+a2+a1+a0 respectively. An adder 47, finally, operates a7+a6+a5+a4+a3+a2+a1+a0. For example, when a7a6a5a4a3a2a1a0=01000110, then k2k1k0=0+1+0+0+0+1+1+0=011 (3 in decimal).

The extension-code generator 7 comprising logic gates as shown in FIG. 1 is designed to produce the extension codes "c2c1c0" and the flag "R" as a function of the 3-bit code "k2k1k0" and the flag "Z". Table 2 is a truth table for the extension-code generator 7.

TABLE 2

| k2 | k1 | k0 | (K) | Z | c2 | c1 | c0 | R |
|---|---|---|---|---|---|---|---|---|
| 0 | 1 | 0 | (2) | 0 | 1 | 1 | 0 | 0 |
| 0 | 1 | 1 | (3) | 0 | 1 | 0 | 0 | 0 |
| 1 | 0 | 0 | (4) | 0 | 0 | 0 | 0 | 0 |
| 1 | 0 | 1 | (5) | 0 | 0 | 0 | 1 | 1 |
| 1 | 1 | 0 | (6) | 0 | 1 | 0 | 1 | 1 |
| * | * | * | (*) | 1 | 0 | 1 | 0 | * |

Table 2 is designed in accordance with the encoding rule explained before. The symbol "*" in Table 2 means "don't-care", i.e. either "0" or "1" will do. The flag "R" indicates the polarity (positive or negative) of the 8-bit binary codes. As described before, in the case of a positive code; i.e., K(=k2k1k0) is 2, 3 or 4, a proper extension code with 4-K "1"s is added to the 8-bit binary code as the lower 3 bits of a desired 4/11 code, and in the case of a negative code; i.e., K is 5 or 6, an extension code with 4-(8-K) "1"s is added to the inverted 8-bit binary code. The flag "R" becomes "0" when the 8-bit binary code is positive and "1" when negative.

The EXOR-gates $2a$-$2h$ keep or invert the logic of all bits of the 8-bit binary code a7a6a5a4a3a2a1a0a in accordance with the flag "R", and then output the temporary code s7s6s5s4s3s2s1s0. That is:
if R=1, then s7s6s5s4s3s2s1s0=$\overline{a7a6a5a4a3a2a1a0}$; and
if R=0, then s7s6s5s4s3s2s1s0=a7a6a5a4a3a2a1a0.

The data selector 6 selects the temporary code s7s6s5s4s3s2s1s0 the — outputs of the EXOR-gates $2a$-$2h$ — or the temporary code t7t6t5t4t3t2t1t0 — the outputs of the table encoder 3 — in accordance with to the flag "Z", which, as mentioned before, becomes "0" when the current 8-bit binary code is not included in the members listed in the table encoder 3, i.e. when the current 8-bit binary code is to be encoded by a bit-adding operation. In that case, the data selector 6 transmits the outputs of the EXOR-gates $2a$-$2h$ to the output register as the upper 8 bits of the 4/11 channel code. That is:
if Z=0, then c10c9c8c7c6c5c4c3=s7s6s5s4s3s2s1s0.
In the other case, i.e. when the current 8-bit binary code coincides with one of the members in the table encoder 3, the data selector 6 transmits the outputs of the table encoder 3 as the upper 8 bits of the 4/11 channel code. That is,
if Z=1, then c10c9c8c7c6c5c4c3=t7t6t5t4t3t2t1t0.
The upper channel code c10c9c8c7c6c5c4c3 and the lower channel code c2c1c0 are loaded into the output register 8. Thereafter the entire channel code will be recorded on an optical record carrier.

Accordingly, as described above, the 4/11 channel codes can be encoded either from the 8-bit binary codes by means of the table encoder having eighteen elements or by means of the logic circuits producing a 3-bit extension code. In comparison with the 4/11 encoding system on the assumption of being implemented with 256 encoder elements, the total amount of the circuits is drastically reduced.

By the way, there has not been a precise explanation about the 3-bit extension codes. They can be defined freely on the condition that they function as parity codes for keeping the number of "1"s in a channel code at four. In this embodiment, however, the extension codes are so designed as to make the run length of "1"s smaller.

It is undesirable for optical recording/reading that "1"s appear successively in a long term. As well known, data composed of "1"s and "0"s are recorded by heating an optical record carrier using a laser light beam. In general, in "1"s' periods, a strong laser beam is focused on the optical record carrier for changing the reflective index of the record carrier and in "0"s' periods, a laser beam which is so weak as to not change the reflective index is illuminated. Thus, areas recorded as "1"s stand out in reflective index from other areas recorded as "0"s or nothing not recorded. For example, in the case of a write-once optical record carrier, the areas corresponding to "1"s are burned out by the laser beam.

It is desirable that every area corresponding to "1" is formed so as to be the same size, but those areas, being formed by heat, tend to be formed irregularly. As is well known, the longer the successive "1"s are recorded in a track-tangential direction, the wider the recorded mark become in a track-radial(vertical) direction due to heat dispersion. The expanded marks, thereafter, cross-talk to with adjacent tracks.

It is, therefore, preferable that the run length of "1"s, i.e. the tangential length of an independent heat-recorded be small. The run length of 4/11 codes is at most "4" in each channel code; e.g. "00111100000". But since they are recorded in succession, there are cases in which the run length exceeds four. For example, when a channel code "11110000000" is recorded just after a channel code "00101010001" — both are positive codes — the successive codes recorded on the record carrier will be:
00101010001111110000000
Obviously, five "1"s are recorded successively stretched over the two channel codes.

The codes "111" and "011" are not included in the set of external codes because they increase the run length If the code "111" were employed as the extension code for eight 8-bit binary codes having one "1", which are listed in the table encoder 3 in the first embodiment (see Table 1), the number of the table-encoder elements would be reduced to "ten". But on the other hand, the maximum run length would increase to seven. Similarly, the extension code "011" would increase the maximum run length to six.

The chosen extension codes "110", "100", "000", "001" and "101" have at most one "1" at the positions of the least significant two bits. Therefore, the maximum run length is five; yielding in the case that the current channel code is "******101" "******001" and the next channel code is "11110000000", A second embodiment of the present invention will now be described. In this embodiment, the maximum run length of "1"s is limited to three. For the purpose, the table encoder 3 is rather expanded as described below, while all of the other members are the same as those in the first embodiment. Table 3 expresses the truth table of the table encoder 3 of the second embodiment.

TABLE 3

|  | a7 | a6 | a5 | a4 | a3 | a2 | a1 | a0 | c10 | c9 | c8 | c7 | c6 | c5 | c4 | c3 |
|---|---|---|---|---|---|---|---|---|---|---|---|---|---|---|---|---|
| #1 | 0 | 0 | 0 | 0 | 0 | 0 | 0 | 0 | 1 | 0 | 0 | 1 | 0 | 0 | 1 | 0 |
| #2 | 1 | 0 | 0 | 0 | 0 | 0 | 0 | 0 | 1 | 1 | 0 | 1 | 0 | 0 | 0 | 0 |
| #3 | 0 | 1 | 0 | 0 | 0 | 0 | 0 | 0 | 0 | 1 | 1 | 0 | 1 | 0 | 0 | 0 |

TABLE 3-continued

|     | a7 | a6 | a5 | a4 | a3 | a2 | a1 | a0 | c10 | c9 | c8 | c7 | c6 | c5 | c4 | c3 |
|-----|----|----|----|----|----|----|----|----|-----|----|----|----|----|----|----|----|
| #4  | 0  | 0  | 1  | 0  | 0  | 0  | 0  | 0  | 0   | 0  | 1  | 1  | 0  | 1  | 0  | 0  |
| #5  | 0  | 0  | 0  | 1  | 0  | 0  | 0  | 0  | 0   | 0  | 0  | 1  | 1  | 0  | 1  | 0  |
| #6  | 0  | 0  | 0  | 0  | 1  | 0  | 0  | 0  | 0   | 0  | 0  | 0  | 1  | 1  | 0  | 1  |
| #7  | 0  | 0  | 0  | 0  | 0  | 1  | 0  | 0  | 1   | 0  | 0  | 0  | 0  | 1  | 1  | 0  |
| #8  | 0  | 0  | 0  | 0  | 0  | 0  | 1  | 0  | 0   | 1  | 0  | 0  | 0  | 0  | 1  | 1  |
| #9  | 0  | 0  | 0  | 0  | 0  | 0  | 0  | 1  | 1   | 0  | 1  | 0  | 0  | 0  | 0  | 1  |
| #10 | 1  | 1  | 1  | 1  | 1  | 1  | 1  | 1  | 0   | 1  | 0  | 1  | 0  | 0  | 0  | 1  |
| #11 | 0  | 1  | 1  | 1  | 1  | 1  | 1  | 1  | 1   | 0  | 1  | 1  | 0  | 0  | 0  | 0  |
| #12 | 1  | 0  | 1  | 1  | 1  | 1  | 1  | 1  | 0   | 1  | 0  | 1  | 1  | 0  | 0  | 0  |
| #13 | 1  | 1  | 0  | 1  | 1  | 1  | 1  | 1  | 0   | 0  | 1  | 0  | 1  | 1  | 0  | 0  |
| #14 | 1  | 1  | 1  | 0  | 1  | 1  | 1  | 1  | 0   | 0  | 0  | 1  | 0  | 1  | 1  | 0  |
| #15 | 1  | 1  | 1  | 1  | 0  | 1  | 1  | 1  | 0   | 0  | 0  | 0  | 1  | 0  | 1  | 1  |
| #16 | 1  | 1  | 1  | 1  | 1  | 0  | 1  | 1  | 1   | 0  | 0  | 0  | 0  | 1  | 0  | 1  |
| #17 | 1  | 1  | 1  | 1  | 1  | 1  | 0  | 1  | 1   | 1  | 0  | 0  | 0  | 0  | 1  | 0  |
| #18 | 1  | 1  | 1  | 1  | 1  | 1  | 1  | 0  | 0   | 1  | 1  | 0  | 0  | 0  | 0  | 1  |
| #19 | 1  | 1  | 1  | 1  | 0  | 0  | 0  | 0  | 0   | 0  | 1  | 1  | 0  | 0  | 0  | 1  |
| #20 | 0  | 1  | 1  | 1  | 1  | 0  | 0  | 0  | 1   | 0  | 0  | 1  | 1  | 0  | 0  | 0  |
| #21 | 0  | 0  | 1  | 1  | 1  | 1  | 0  | 0  | 0   | 1  | 0  | 0  | 1  | 1  | 0  | 0  |
| #22 | 0  | 0  | 0  | 1  | 1  | 1  | 1  | 0  | 0   | 0  | 1  | 0  | 0  | 1  | 1  | 0  |
| #23 | 0  | 0  | 0  | 0  | 1  | 1  | 1  | 1  | 0   | 0  | 0  | 1  | 0  | 0  | 1  | 1  |
| #24 | 1  | 1  | 1  | 0  | 1  | 0  | 0  | 0  | 1   | 0  | 1  | 0  | 1  | 0  | 0  | 0  |
| #25 | 1  | 1  | 1  | 0  | 0  | 1  | 0  | 0  | 0   | 1  | 0  | 1  | 0  | 1  | 0  | 0  |
| #26 | 1  | 1  | 1  | 0  | 0  | 0  | 1  | 0  | 0   | 0  | 1  | 0  | 1  | 0  | 1  | 0  |
| #27 | 1  | 1  | 1  | 0  | 0  | 0  | 0  | 1  | 0   | 0  | 0  | 1  | 0  | 1  | 0  | 1  |
| #28 | 1  | 1  | 1  | 0  | 0  | 0  | 0  | 0  | 1   | 1  | 0  | 0  | 1  | 0  | 0  | 0  |
| #29 | 0  | 0  | 0  | 0  | 0  | 1  | 1  | 1  | 0   | 0  | 1  | 1  | 0  | 0  | 1  | 0  |
| #30 | 0  | 0  | 0  | 0  | 0  | 0  | 1  | 1  | 0   | 0  | 0  | 0  | 0  | 1  | 1  | 1  |
| #31 | 0  | 0  | 0  | 1  | 1  | 1  | 1  | 1  | 0   | 0  | 0  | 1  | 1  | 1  | 0  | 0  |
| others |  |  |  |  |  |  |  |  | 1 | 1  | 1  | 1  | 1  | 1  | 1  | 1  |

In this embodiment, the 8-bit binary codes having four successive "1"s or having three successive "1"s at the positions of the most significant three bits are listed in the table encoder 3 in addition to the eighteen 8-bit binary codes shown in Table 1.

In Table 3, lower 3 bit-code c2c1c0, being 010, is not described. Code numbers #1–#31 are employed for better explanation. The channel codes corresponding to the 8-bit binary codes #1–#18 are the same as those described in Table 1. The codes #19–#31, being the subjects of bits-adding encoding in the first embodiment, are listed in the table encoder 3 so as to make run length of "1"s within three.

The 8-bit binary codes #19–#23 having four successive "1"s, although they can be encoded into 4/11 channel codes by a bits-adding encoder, are encoded by the table encoder 3 to 4/11 channel codes in each of which the run length of "1"s is two or less.

The 8-bit binary codes #24–#28, having three successive "1"s at the most significant bit positions, are also encoded by the table encoder 3, because four successive "1"s will appear if the least significant bit of the leading channel code, i.e. the channel code recorded in advance of the current channel code, is "1".

The 8-bit binary codes #29 and #30 have four successive "1"s when extension codes were added in accordance with the encoding rule shown in the first embodiment. An extension code c2c1c0 for the channel code #29 (0000111), having three "1"s, is "100" in accordance with Table 2. Thereupon, the channel code "0000111100" having four successive "1"s would be produced. Similarly, the 8-bit binary code #30 ("00000011") and the extension code "110" would make the channel code "00000011110" having four successive "1"s according to the rule mentioned in the first embodiment. In this embodiment, therefore, those two 8-bit binary codes are also encoded by the table encoder 3.

The 8-bit binary code #31 (=00011111), having five "1"s, is inverted (to "11100000") and then encoded into the channel code "11100000001", having three "1"s at the positions of the most significant three bits, in accordance with the rule shown in the first embodiment. The code #31 also should be listed in the table encoder 3 for the same reason as that of the codes #24–#28.

As explained in the first embodiment, however, each of the 8-bit binary codes #19–#31 is also encoded by the parallel counter 4 and the extension-code generator 7 (both shown in FIG. 1). It appears to be confusing that there exist two channel codes for one 8-bit binary code. In fact, since the same circuit system as shown in the first embodiment is employed, both the table encoder 3 and the bits-adding encoder composed of the parallel counter 4 and the extension-code generator 7 produce respective 4/11 codes which are different from each other. When the 8-bit binary code is "01111000", the former 4/11 channel code is "10011000010" and the latter "01111000000". But as explained in the first embodiment, the data selector 6 selects one of the two, according to the flag "Z" which becomes "1" when the loaded 8-bit binary code coincides with one of the members in the table encoder 3. Therefore, even if both the encoders — the table encoder and the bits adding encoder — output 4/11 channel codes, the output of the bits adding encoder is ignored when the table encoder 3 can encode the loaded 8-bit binary code (i.e. the table encoder 3 does not output "11111111") or the flag "Z" becomes "1". In this case, the extension-code generator outputs "010" according to the flag "Z" being "1". Accordingly, the run length of "1"s can be limited to three, although the number of encoder elements increases to thirty-one.

Figure 4:
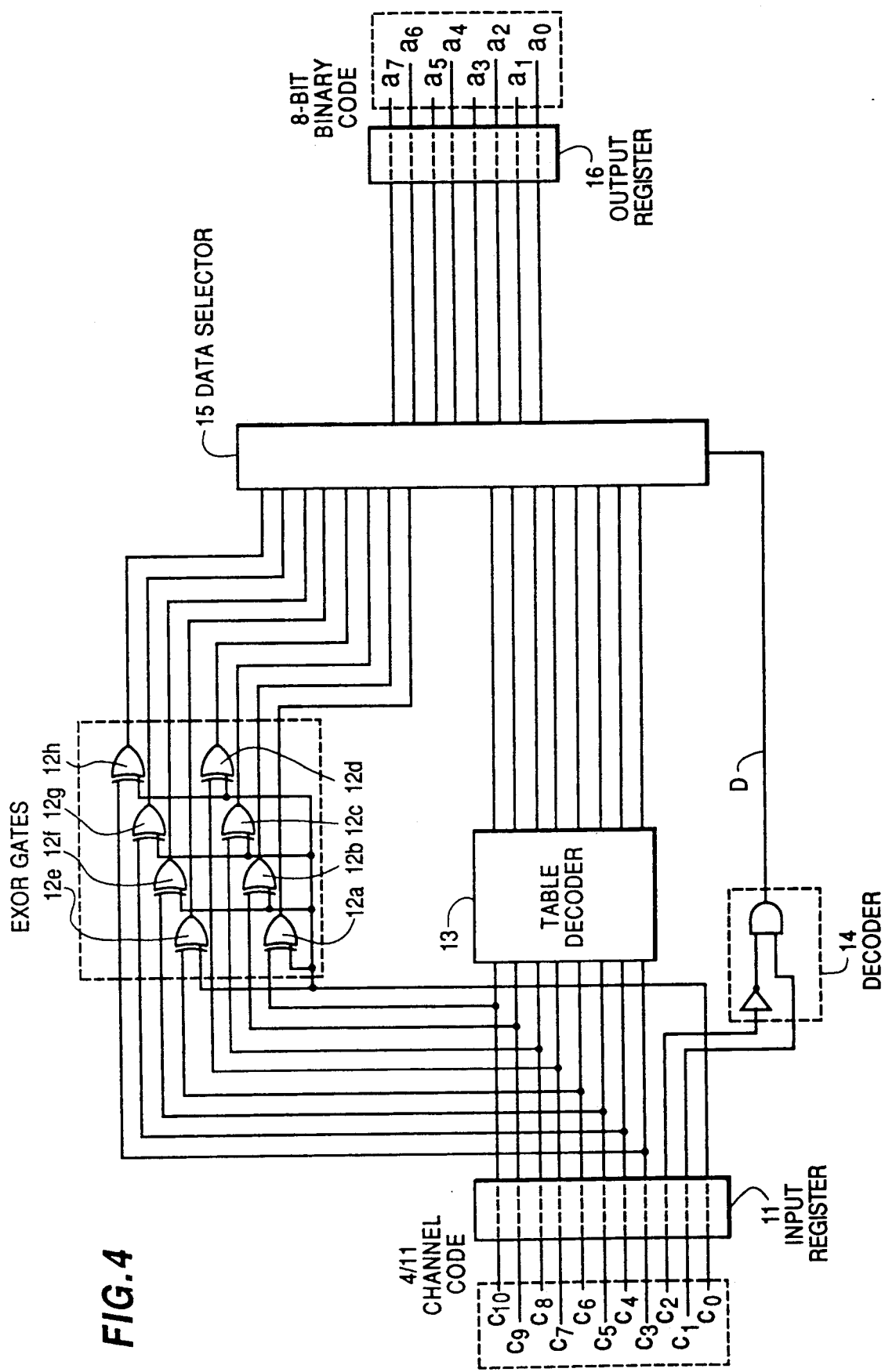
FIG. 4 is a circuit diagram showing a third embodiment of the invention.

A third embodiment of this invention will now be described. FIG. 4 illustrates a circuit diagram of the third embodiment. The embodiment shows a technique for decoding the 4/11 channel code into the 8-bit binary code. In FIG. 4, the 4/11 channel code is loaded into an input register 11. The upper 8 bits of the 4/11 channel code c10,c9,c8,c7,c6,c5,c4 and c3 are fed to inputs of EXOR gates 12a–12h, which invert the logic of the upper 8 bits in accordance with the least significant bit $c_0$ of the loaded 4/11 channel code. The bit $c_2$ and the bit $c_1$, included in the lower 3 bits, are fed to a decoder 14 for outputting "1" as a flag "D" when the extension code "010" is detected. The upper 8 bits of the 4/11 channel code are fed also to a table decoder 13 and then decoded. A data selector 15 transmits either the outputs of the EXOR gates 12a–12h or the outputs of the table decoder 13 to an output register 15 in accordance with the flag "D".

The lower 3 bits $c_2c_1c_0$ in the received 4/11 channel code have been added by the encoding system explained in the first and second embodiments. It has been explained that the 4/11 channel codes are classified to three groups: (1) those composed of 8-bit binary codes (positive codes) and 3-bit extension codes; (2) those composed of inverted 8-bit binary codes (negative codes) and 3-bit extension codes ; and (3) those composed of table-encoded 8-bit binary codes and 3-bit extension codes. It has also explained that those groups are distinguished by the 3-bit extension codes. Table 4 shows a review of those extension codes.

TABLE 4

| c2 | c1 | c0 | groups |
|----|----|----|--------|
| 1 | 1 | 0 | binary + extension |
| 1 | 1 | 0 | binary + extension |
| 0 | 0 | 0 | binary + extension |
| 1 | 0 | 1 | inverted binary + extension |
| 0 | 0 | 1 | inverted binary + extension |
| 0 | 1 | 0 | table-encoded binary + extension |

A 4/11 channel code belonging to the group (1) is decoded simply by removing lower 3 bits because a code composed of upper 8 bits is the original 8-bit binary code itself. A 4/11 channel code belonging to the group (2) is decoded by removing lower 3 bits and by inverting the logic of upper 8 bits. A 4/11 channel code belonging to the group (3) is decoded by a table decoder 13. The decoder 12 outputs "1" as the flag "D" when it detects "01*", where "*" is a don't-care mark. Seeing Table 4, only the channel codes with 3-bit extension codes "010", representing the table-encoded codes , make the flag "D" "1". Therefore the flag "D" shows whether or not a current code is a table-encoded one.

Figure 5:
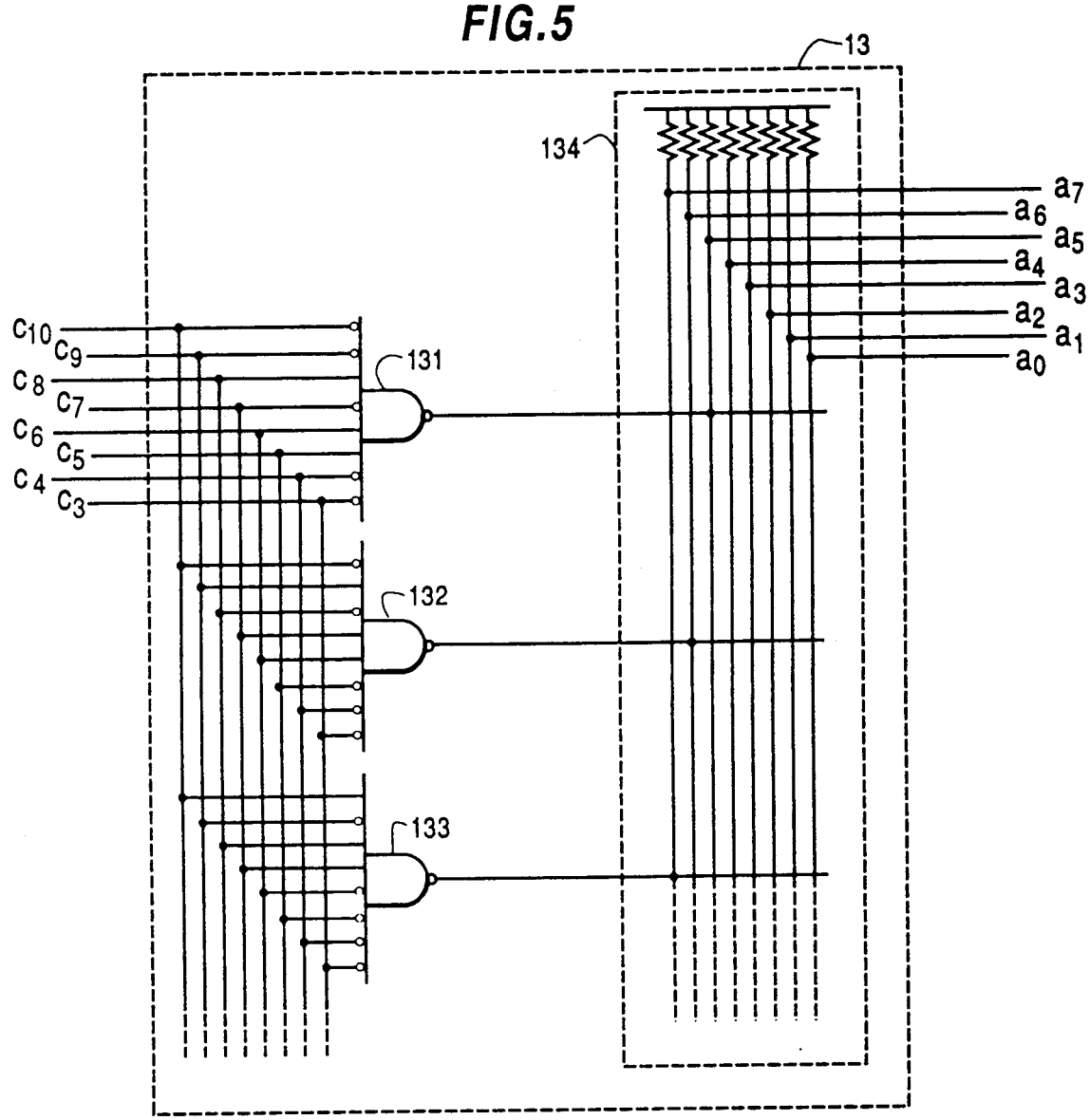
FIG. 5 is a circuit diagram showing a part of a table decoder explained in the third embodiment.

The table decoder 13 comprises decoder elements and a wired-OR matrix. The number of the elements should be the same as number of the encoder elements. In the case of the first embodiment, the number of elements is eighteen and in the case of the second embodiment, thirty-one FIG. 5 shows a partial circuit diagram of the table decoder 13. Decoder elements 131, 132 and 133 and a wired-OR matrix 134 are illustrated. The decoder elements 131, 132 and 133 correspond to the encoder elements 31, 32 and 33 in FIG. 2, respectively.

The EXOR gates 12a–12h invert the logic of the upper 8 bits $c_{10}, c_9, c_8, c_7, c_6, c_5, c_4$ and $c_3$ of the 4/11 channel code in accordance with the least significant bit $c_0$ of the received channel code. Seeing Table 4, the least significant bit $c_0$ represents a flag indicating positive or negative of the channel code. In the case of $c_0 = 1$, the EXOR gates invert the logic of the upper 8 bits of the channel code for deriving the original 8-bit binary code.

The data selector 15 transmits either the outputs of the table decoder 13 or the EXOR gates 12a–12h in accordance with the flag "D", which distinguishes the table-encoded channel codes from others. In the case of $D = 0$, the data selector 15 transmits the outputs of EXOR gates 12a–12h, and in the case of $D = 1$, transmits the outputs of the table decoder 13.

Accordingly, the 4/11 channel codes encoded by the system shown in the first or second embodiment can be decoded into the original 8-bit binary codes using a small scale of circuit.

Figure 6:
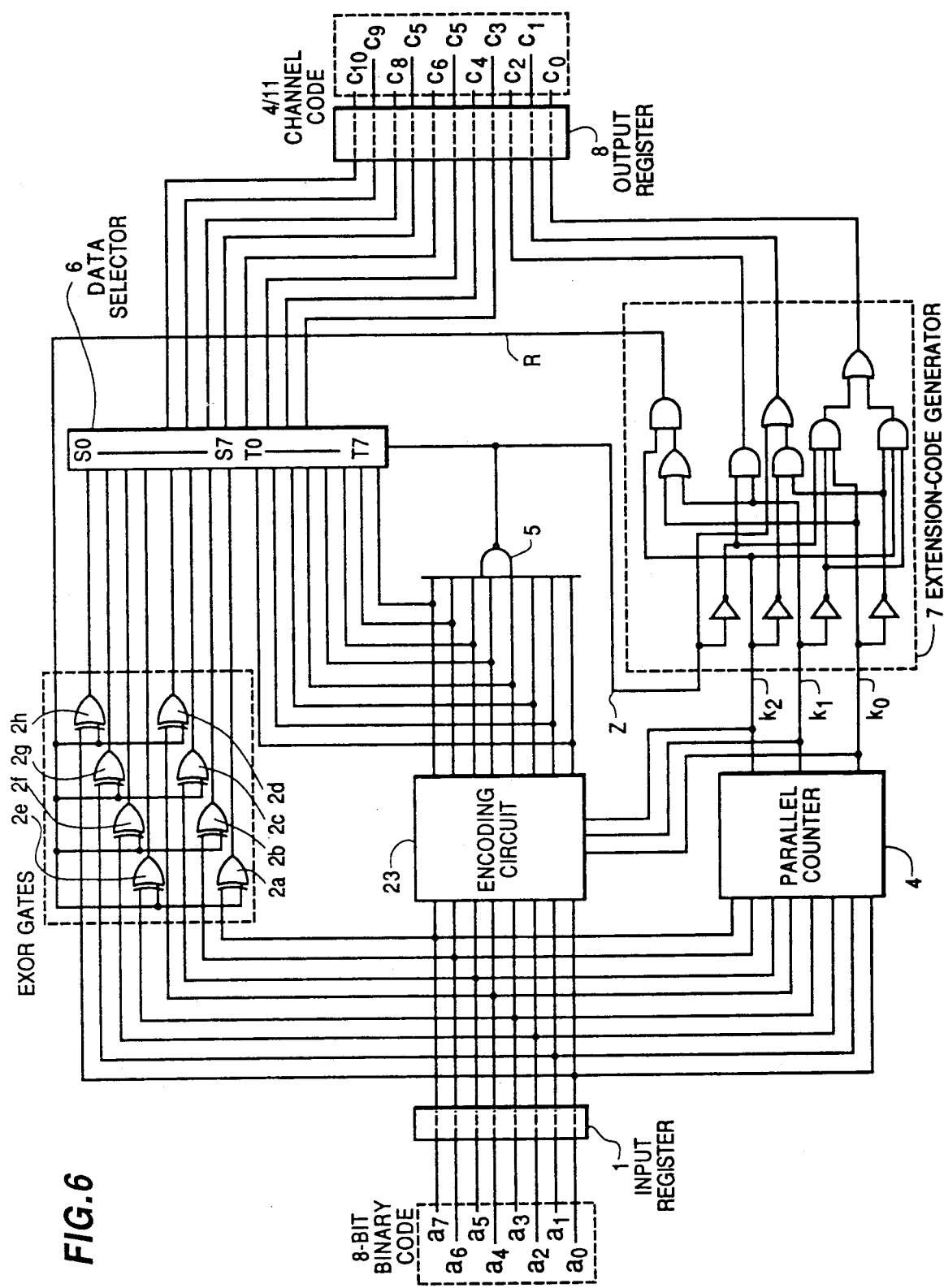
FIG. 6 is a circuit diagram showing a fourth embodiment of the invention.
Figure 7:
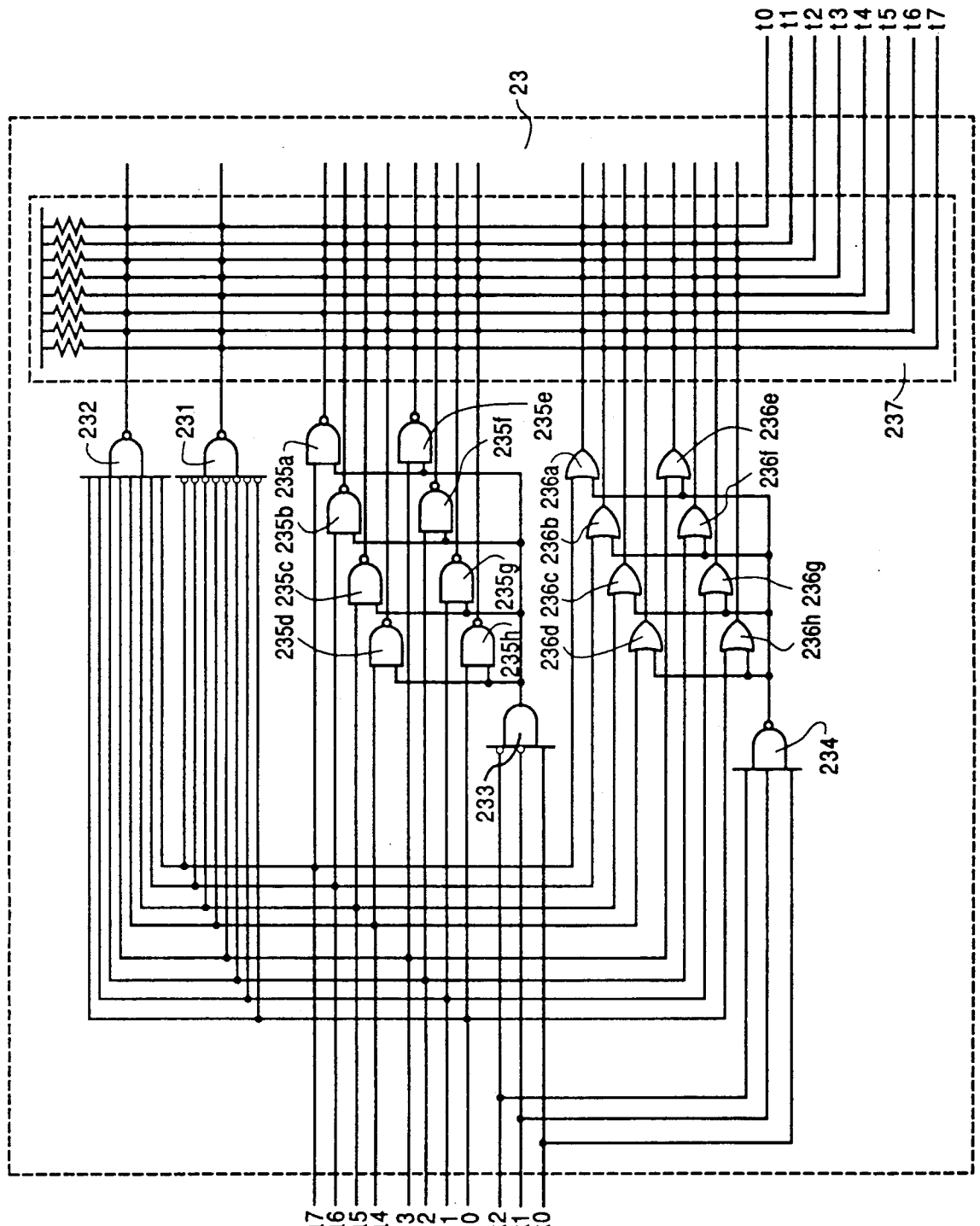
FIG. 7 is a circuit diagram showing an encoding circuit explained in the fourth embodiment.

A fourth embodiment of the present invention will now be described. FIG. 6 is a circuit diagram of the fourth embodiment. In FIG. 6, an encoding circuit 23, fed with the 8-bit binary code $a_7a_6a_5a_4a_3a_2a_1a_0$ and the 3-bit code $k_2k_1k_0$ expressing the number of "1"s in the 8-bit binary code, is employed instead of the table encoder 3 in FIG. 1. FIG. 7 is a circuit diagram of the encoding circuit 23. The encoding circuit 23 comprises encoder elements 231 and 232, 3-bit decoders 233 and 234 , NAND gates 235a–235h, OR gates 236a–236h and a wired-OR matrix 237. Each of the NAND gates 235a–235h and the OR gates 236a–236h has an open-collector output as well as the encoder elements 231 and 232.

The fourth embodiment aims at providing the 4/11 encoding disclosed in the first embodiment with a smaller-sized circuit. In the first embodiment, eighteen encoder elements are necessary for the eighteen 8-bit binary codes being neither positive nor negative codes. But, noticing that the codes listed in Table 1 have 0, 1, 7 or 8 "1"s, the circuit for the table encoding can be reduced.

The encoder elements 231 and 232 are responsible for converting the 8-bit binary codes "00000000" and "11111111" to the corresponding 4/11 codes shown in Table 1. The 3-bit decoder 233 and the NAND gates 235a–236h are responsible for converting the 8-bit binary codes having one "1" to corresponding 4/11 channel codes. The 3-bit decoder 233 outputs "1" when receiving "001" ("one" in decimal) from the parallel counter 4. In other cases, the 3-bit decoder 233 outputs "0". All of the NAND gates 235a–235h, when receiving "0" from the 3-bit decoder 233, output "1"s (open), and when receiving "1", output the inverted pattern of the 8-bit binary code $a_7a_6a_5a_4a_3a_2a_1a_0$. That is, the NAND gates 235a–235h output "11111111" or output 8-bit code having seven "1"s. For example, when the 8-bit binary code is "00100000", the NAND gates 235a–235h output "11011111", and when the 8-bit binary code is "10010110", they output "11111111". Seeing Table 1, there are eight 8-bit binary codes having one "1", each of which is characterized by the position of the bit being "1". Therefore, one of the NAND gates 235a–235h outputs "0" in response to the corresponding one of the eight 8-bit binary codes. Each of the outputs of the NAND gates is fed to the wired-OR matrix 237 for producing the upper 8 bits of the corresponding 4/11 channel code shown in Table 1. For example, when the current 8-bit binary code is "00100000", the NAND gate 235c outputs "0" while the other NAND gates output "1"s (or in open state). The output, then, pulls down the vertical lines of the wired-OR matrix 237 corresponding to t7, t6, t3, t1 and t0 (dotted in FIG. 7) in order to output "00110100".

In the same manner, the 3-bit decoder 234 and the OR gates 236a–236h work for converting the 8-bit binary codes having seven "1"s. The 3-bit decoder 234 outputs "0" when it receives "111" ("seven" in decimal) from the parallel counter 4. In other cases, it outputs "1". Therefore, one of the OR gates corresponding to the bit of (unique) "0" in the 8-bit binary code outputs "0". The output of every OR gate is connected to the wired-OR matrix 237 for outputting the temporary code or the upper 8 bits of the corresponding 4/11 channel code in Table 1.

Accordingly, taking advantage of the features of the table-encoded codes listed in Table 1 being composed of seven "1" and one "0" or one "1" and seven "0"s, the circuit for table encoding can be drastically reduced in size.

What is claimed is:

1. An encoding system for converting an M-bit binary code composed of M bits each being a "1" or a "0" to an N-bit channel code composed of N bits each being a "1" or a "0", the number of "1"s in said N-bit channel code being a fixed number, i, said system comprising:

a count means for counting the number of "1"s, k, in an input M-bit binary code;

a logic gate means responsive to a count value, k, by said count means for passing said input M-bit binary code as is when k is equal to or smaller than i and inverting a logic state of said input M-bit binary code when k is larger than (M−i), said M-bit binary code passed as is or the logic inverted M-bit binary code being outputted as a first M-bit temporary code from said logic gate means;

an encoding means for encoding said input M-bit binary code into a specific M-bit binary code when said input M-bit binary code is one of a plurality of predetermined codes, said specific M-bit binary code being outputted as a second M-bit temporary code from said encoding means;

a selection means for selectively outputting said second M-bit temporary code when said input M-bit binary code is one of said plurality of predetermined codes and for otherwise outputting said first M-bit temporary code to obtain a selected M-bit temporary code;

an extension code producing means for producing an (N−M)-bit extension code according to said input M-bit binary code such that the total number of "1"s in said selected M-bit temporary code and said (N−M) bit extension code becomes equal to i; and a means for combining said selected M-bit temporary code and said (N−M)-bit extension code to obtain said N-bit channel code.

2. A system according to claim 1, wherein said encoding means produces a selection signal when said input M-bit binary code is one of said plurality of predetermined codes, and wherein said selection means is responsive to said selection signal for outputting said second M-bit temporary code.

3. A decoding system for reproducing an M-bit binary code from an N-bit channel code produced by an encoding system for converting an M-bit binary code composed of M bits each being a "1" or a "0" to an N-bit channel code composed of N bits each being a "1" or a "0", the number of "1"s in said N-bit channel code being a fixed number, i, said system comprising:

a count means for counting the number of "1"s, k, in an input M-bit binary code;

a logic gate means responsive to a count value, k, by said count means for passing said input M-bit binary code as is when k is equal to or smaller than i and inverting a logic state of said input M-bit binary code when k is larger than (M−i), said M-bit binary code passed as is or the logic inverted M-bit binary code being outputted as a first M-bit temporary code from said logic gate means;

an encoding means for encoding said input M-bit binary code into a specific M-bit binary code when said input M-bit binary code is one of a plurality of predetermined codes, said specific M-bit binary code being outputted as a second M-bit temporary code from said encoding means;

a selection means for selectively outputting said second M-bit temporary code when said input M-bit binary code is one of said plurality of predetermined codes and for otherwise outputting said first M-bit temporary code to obtain a selected M-bit temporary code;

an extension code producing means for producing an (N−M)-bit extension code according to said input M-bit binary code such that the total number of "1"s in said selected M-bit temporary code and said N−M) bit extension code becomes equal to i; and a means for combining said selected M-bit temporary code and said (N−M) bit extension code to obtain said N-bit channel code;

said decoding system comprising:

a classifying means for decoding said (N−M)-bit extension code in an input N-bit channel code to classify said input N-bit channel code into one of either; a first type in which said selected M-bit temporary code in said input N-bit channel code is said M-bit binary code passed as is in said encoding system, and a second type in which said selected M-bit temporary code in said input N-bit channel code is said logic inverted M-bit binary code and a third type in which said selected M-bit temporary code in said input N-bit channel code is said second M-bit temporary another logic gate means responsive to an output of said classifying means for passing said selected M-bit temporary code in said input N-bit channel code as is when said input N-bit channel code is said first type and inverting a logic state of said selected M-bit temporary code in said input N-bit channel code when said input N-bit channel code is said second type to obtain a first reproduced M-bit binary code;

a decoding means for decoding said selected M-bit temporary code in said input N-bit channel code to a corresponding one of said plurality of predetermined codes when said input N-bit channel code is said third type to obtain a second reproduced M-bit binary code; and a selection means responsive to the output of said classifying means for selectively outputting said second reproduced M-bit binary code when said input N-bit channel code is said third type and for otherwise outputting said first reproduced M-bit binary code to thereby obtain a reproduced M-bit binary code.

4. An encoding system for converting an 8-bit binary code composed of 8 bits each being a "1" or a "0" to an 11-bit channel code composed of 11 bits each being a "1" or a "0", the number of "1"s in said 11 bit channel code being 4, said system comprising:

a count means for counting the number of "1"s, k, in an input 8-bit binary code;

a logic gate means responsive to a count value, k, by said count means for passing said input 8-bit binary code as is when k is equal to one of either 2 and 3 and 4 and inverting a logic state of said input 8-bit binary code when k is equal to one of either 5 and 6, said 8-bit binary code passed as is or the logic inverted 8-bit binary code being outputted as a first 8-bit temporary code from said logic gate means;

an encoding means for encoding said input 8-bit binary code into a specific 8-bit binary code when said input 8-bit binary code is one of a plurality of predetermined codes, said specific 8-bit binary code being outputted as a second 8-bit temporary code from said encoding means;

a selection means for selectively outputting said second 8-bit temporary code when said input 8-bit binary code is one of said plurality of predetermined codes and for otherwise outputting said first 8-bit temporary code to obtain a selected 8-bit temporary code;

an extension code producing means for producing a 3-bit extension code according to said input 8-bit binary code such that the total number of "1"s in said selected 8-bit temporary code and said 3-bit extension code becomes equal to 4; and a means for combining said selected 8-bit temporary code and said 3-bit extension code to obtain said 11-bit channel code.

5. A system according to claim 4, wherein said plurality of predetermined codes include 8-bit binary codes in each of which k is equal to one of either 0 and 1 and 7 and 8.

6. A system according to claim 5, wherein said plurality of predetermined codes further include 8-bit binary codes each contains therein one of either 3 and 4 successive "1"s.

7. A system according to claim 4, wherein said encoding means produces a selection signal when said input 8-bit binary code is one of said plurality of predetermined codes, and wherein said selection means is responsive to said selection signal for outputting said second 8-bit temporary code.

8. A decoding system for reproducing an 8-bit binary code from an 11-bit channel code produced by an encoding system for converting an 8-bit binary code composed of 8 bits each being a "1" or a "0" to an 11-bit channel code composed of 11 bits each being a "1" or a "0", the number of "1"s in said 11 bit channel code being 4, said system comprising:

a count means for counting the number of "1"s, k, in an input 8-bit binary code;

a logic gate means responsive to a count value, k, by said count means for passing said input 8-bit binary code as is when k is equal to one of either 2 and 3 and 4 and inverting a logic state of said input 8-bit binary code when k is equal to one of either 5 or 6, said 8-bit binary code passed as is or the logic inverted 8-bit binary code being outputted as a first 8-bit temporary code from said logic gate means;

an encoding means for encoding said input 8-bit binary code into a specific 8-bit binary code when said input 8-bit binary code is one of a plurality of predetermined codes, said specific 8-bit binary code being outputted as a second 8-bit temporary code from said encoding means;

a selection means for selectively outputting said second 8-bit temporary code when said input 8-bit binary code is one of said plurality of predetermined codes and for otherwise outputting said first 8-bit temporary code to obtain a selected 8-bit temporary code;

an extension code producing means for producing a 3-bit extension code according to said input 8-it binary code such that the total number of "1"s in said selected 8-bit temporary code and said 3-bit extension code becomes equal to 4; and a means for combining said selected 8-bit temporary code and said 3-bit extension code to obtain said 11-bit channel code;

said decoding system comprising:

a classifying means for decoding said 3-bit extension code in an input 11-bit channel code to classify said input 11-bit channel code into one of either a first type in which said selected 8-bit temporary code in said input 11-bit channel code is said 8-bit binary code passed as is in said encoding system, and a second type in which said selected 8-bit temporary code in said input 11-bit channel code is said logic inverted 8-bit binary code and a third type in which said selected 8-bit temporary code in said input 11-bit channel code is said second 8-bit temporary code;

another logic gate means responsive to an output of said classifying means for passing said selected 8-bit temporary code in said input 11-bit channel code as is when said input 11-bit channel code is said first type and inverting a logic state of said selected 8-bit temporary code in said input 11-bit channel code when said input 11-bit channel code is said second type to obtain a first reproduced 8-bit binary code;

a decoding means for decoding said selected 8-bit temporary code in said input 11-bit channel code to a corresponding one of said plurality of predetermined codes when said input 11-bit channel code is said third type to obtain a second reproduced 8-bit binary code; and selection means responsive to the output of said classifying means for selectively outputting said second reproduced 8-bit binary code when said input 11-bit channel code is said third type and for otherwise outputting said first reproduced 8-bit binary code to thereby obtain a reproduced 8-bit binary code.

* * * * *